(12) United States Patent
Li et al.

(10) Patent No.: US 9,574,641 B2
(45) Date of Patent: Feb. 21, 2017

(54) LARGE-TORQUE CHAIN-GUIDE TYPE CONSTANT RATIO/CONTINUOUSLY VARIABLE TRANSMISSION

(76) Inventors: Zhengtong Li, Beijing (CN); Yachen Zhang, Beijing (CN)

( * ) Notice: Subject to any disclaimer, the term of this patent is extended or adjusted under 35 U.S.C. 154(b) by 715 days.

(21) Appl. No.: 13/703,029

(22) PCT Filed: Jun. 8, 2011

(86) PCT No.: PCT/CN2011/075428
§ 371 (c)(1),
(2), (4) Date: Dec. 9, 2012

(87) PCT Pub. No.: WO2011/153936
PCT Pub. Date: Dec. 15, 2011

(65) Prior Publication Data
US 2013/0090197 A1   Apr. 11, 2013

(30) Foreign Application Priority Data

Jun. 10, 2010  (CN) .......................... 2010 1 0196571

(51) Int. Cl.
*F16H 9/08*  (2006.01)
*F16H 7/06*  (2006.01)
(52) U.S. Cl.
CPC . *F16H 9/08* (2013.01); *F16H 7/06* (2013.01)
(58) Field of Classification Search
CPC ................. F16H 7/06; F16H 9/08; F16H 7/00
(Continued)

(56) References Cited

U.S. PATENT DOCUMENTS

| 311,402 A | * | 1/1885 | Withington | ..................... 474/83 |
| 594,622 A | * | 11/1897 | Harton | ............................. 474/83 |

(Continued)

FOREIGN PATENT DOCUMENTS

FR              2685419         *  6/1993

*Primary Examiner* — Michael Mansen
*Assistant Examiner* — Mark K Buse (57) ABSTRACT

A large-torque chain-guide type constant ratio/continuously variable transmission is disclosed. The transmission comprises transmission rollers (A, B), an endless transmission chain or belt (C) and two chain guiders (D, E) respectively arranged beside the two transmission rollers. Each chain guider comprises n groups of grooved-pulleys, and each group comprises m grooved-pulleys. Each grooved-pulley rotates freely around a grooved-pulley axis, and an angle α is formed between the axis of at least one grooved-pulley in each group of grooved-pulleys and a roller axis of the transmission roller matched with the same grooved-pulley. The angle α enables the chain entering the chain guider and the chain leaving the chain guider to move a certain axial distance, i.e. a chain distance, on the transmission rollers, wherein the chain distance is required to be larger than the width of the chain or the belt. The endless transmission chain passes sequentially through the pulley groove of at least one grooved-pulley in one group and the driving roller under the guidance of the chain guider, and is guided to a driven roller after winding n circles around both the chain guider and the driving roller. Whereafter, the transmission chain passes sequentially through the pulley groove of at least one grooved-pulley in one group and the driven roller under the guidance of the chain guider, and returns to the driving roller to be closed after winding n circles around both the chain guider and the driven roller. The transmission has small size and compact structure, and can output a large torque.

2 Claims, 6 Drawing Sheets

(58) Field of Classification Search
USPC .......................................................... 474/83
See application file for complete search history.

(56) References Cited

U.S. PATENT DOCUMENTS

| | | | | |
|---|---|---|---|---|
| 2,638,008 A | * | 5/1953 | Guibert | 474/83 |
| 3,394,602 A | * | 7/1968 | Coghill | 474/83 |
| 3,894,439 A | * | 7/1975 | Borello | 474/83 |
| 3,906,809 A | * | 9/1975 | Erickson | 474/83 |

* cited by examiner

LARGE-TORQUE CHAIN-GUIDE TYPE CONSTANT RATIO/CONTINUOUSLY VARIABLE TRANSMISSION

BACKGROUND OF THE INVENTION

The present invention belongs to the technical field of mechanical drive, which relates to a mechanical continuously variable transmission, specifically to a mechanical continuously variable transmission that can output a large torque and larger speed ratio, as well as provides a constant-ratio transmission that can output a large torque.

In the present technology, most mechanical devices which need to change speed, such as vehicle, vessels, engineering machine, factories and mines and harbors machine etc, continuously speed is superior to step speed change, firstly because it simplifies the manipulation, and secondly the speed variation is smooth, which is quite favorable to the vehicles, and especially it can realize the best match between transmission systems and engine operating modes, which is favorable to the working life of the engines and energy conservation.

Due to above advantages of the Continuously Variable Transmission (CVT), there are kinds of CVT developed, wherein the friction transmission of conical-plate is widely used. However, this transmission have intrinsic defects that is difficult to overcome, such as its output torque being small, most below 300 Nm, which can hardly apply to motor vehicles of great displacement, furthermore, it can more hardly be satisfied for larger requirement of output torque, such as trucks, diesel locomotives, tanks and watercrafts. Moreover, its speed regulation range, i.e., speed ratio is restricted, normally not more than 6:1. Therefore it needs to suit with transmission of fixed speed ratio. A more realistic problem is that this transmission requires higher quality and technical requirement for the drive chains or drive belts, resulting in the cost of making and using transmissions increase highly, which is disadvantageous for the popularity and generalization of this transmission.

The publicized patent application titled "a large-torque breaker-roller type constant ratio/continuously variable transmission" (hereafter referred to "breaker-roller type"), with application number of 200910136244.1, publicized a large-torque breaker-roller type continuously variable transmission and this transmission introduced the concept of breaker roller, which was consisted of two pairs of breaker-rollers of driving roller and driven roller. Each pair of breaker roller was two drive rollers operating synchronously. A drive chain rotated n cycles outside the driving breaker rollers and directed to the driven breaker rollers to rotate n cycles on them and returned to the driving breaker rollers to form a closed circle. Due to effective augment of wrap angles between the chain belt and the drive rollers, the skidding in driving was avoid, achieving a large power (torque) output. However, this breaker-roller type transmission needs two pairs of breaker-rollers that is four rollers, resulting in the structure being larger.

BRIEF SUMMARY OF THE INVENTION

With the purpose of improving inadequacy of the existing technology, the present invention provides a large-torque chain-guide type constant-ratio transmission which can output a large torque with small size and compact structure.

Another object of the present invention is to provide a large-torque chain-guide type transmission with above mentioned characteristics.

The objects of the present invention can be realized as follows:

A large-torque chain-guide constant ratio transmission, which is a chain type or belt type drive mechanism and comprises drive rollers and an endless drive chain (hereinafter collectively referred as "chain");

the drive rollers comprise driving roller and driven roller.

The present large-torque chain-guide constant ratio transmission also comprises two chain guiders, which are arranged beside the driving roller and the driven roller respectively.

The chain guider comprises n groups of grooved-pulleys, and each group comprises m grooved-pulleys, wherein n is the number of cycles that the chain needs to rotate the drive roller, m is an integer between 1-3, each of the grooved-pulley in every group is arranged on respective grooved-pulley axis thereof, or the respective corresponding grooved-pulleys in each group are arranged on one grooved-pulley axis, or several of them are arrange on one grooved-pulley axis, or each of them is arranged on the respective grooved-pulley axis, each grooved-pulley rotates freely on the grooved-pulley axis, and an angle $\alpha$ is formed between the axis of at least one grooved-pulley in each group of grooved-pulleys and the roller axis of the drive roller matched with the above at least one grooved-pulley, the angle $\alpha$ between the grooved-pulley axis and the drive roller axis enables the chain entering the chain guider and the chain leaving the chain guider to move a certain axial distance d on the drive roller, which is referred to chain distance, wherein this chain distance should be larger than the width of the chain or the belt.

The endless drive chain is directed via chain guider, that is, passed sequentially through the pulley groove of least one grooved-pulley in one group to the driving roller, then to the pulley groove of least one grooved-pulley in next group and then to the driving roller, rotating n cycles on the driving roller and the chain guider, and then directed to the driven roller, and is directed via chain guider, that is, passed sequentially through the pulley groove of least one grooved-pulley in one group to the driven roller, then to the pulley groove of least one grooved-pulley in next group and then to the driven roller, rotating n cycles on the driven roller and the chain guider, and then returned to the driving roller to close.

A large-torque chain-guide continuously variable transmission, which is a chain type or belt type transmission drive mechanism and comprises drive rollers and an endless drive chain.

The drive rollers comprise driving roller and driven roller, each of the drive rollers comprises one roller axis, and the drive roller is arranged on each of the roller axis.

The drive rollers are conical rollers, diameters of which become gradually larger or gradually smaller on the axial directions of the drive rollers, and the large end of the driving roller is arranged relatively to the small end of the driven roller; the drive rollers are diameter-variable rollers, and the diameter-variable rollers are such structures that the external diameters of the drive rollers which contact with the drive chain are enable to change size.

The present large-torque chain-guide continuously variable transmission further comprises two chain guiders, which are arranged beside the driving roller and the driven roller respectively.

The chain guider comprises n groups of grooved-pulleys, and each group comprises m grooved-pulleys, wherein n is the number of cycles that the chain needs to rotate the drive roller, m is a integer between 1-3, each of the grooved-pulley in every group is arranged on respective grooved-pulley axis thereof, or the respective corresponding grooved-pulleys in each group are arranged on one grooved-pulley axis, or several of them are arrange on one grooved-pulley axis, or each of them is arranged on the respective grooved-pulley axis, each grooved-pulley rotates freely on the grooved-pulley axis, and an angle $\alpha$ is formed between the axis of at least one grooved-pulley in each group of grooved-pulleys and the roller axis of the drive roller matched with the above at least one grooved-pulley, the angle $\alpha$ between the grooved-pulley axis and the drive roller axis enables the chain entering the chain guider and the chain leaving the chain guider to move a certain axial distance d on the drive roller, which is referred to chain distance, wherein this chain distance should be larger than the width of the chain or the belt.

The endless drive chain is directed via chain guider, that is, passed sequentially through the pulley groove of least one grooved-pulley in one group to the driving roller, then to the pulley groove of least one grooved-pulley in next group and then to the driving roller, rotating n cycles on the driving roller and the chain guider, and then directed to the driven roller, and is directed via chain guider, that is, passed sequentially through the pulley groove of least one grooved-pulley in one group to the driven roller, then to the pulley groove of least one grooved-pulley in next group and then to the driven roller, rotating n cycles on the driven roller and the chain guider, and then returned to the driving roller to close.

The present large-torque chain-guide continuously variable transmission further comprises speeding regulation mechanism, which is connected with the conical rollers or the diameter-variable rollers or the chain, such that the external diameters of the conical rollers or the diameter-variable rollers which contact with the drive chain is variable.

The chain guider could be:

a chain guider of single wheel and co-rotation: m is 1, that is each group of grooved-pulley comprises one grooved-pulley, n grooved-pulleys in n groups which are parallel to each other form the chain guider of single wheel and co-rotating. The several grooved-pulleys are coaxial, or some of them are coaxial, and the other grooved-pulleys have their respective grooved-pulley axis which are parallel to each other, or each grooved-pulley has their respective grooved-pulley axis and each of the grooved-pulley axis is parallel to each other, and an angle $\alpha$ is formed between the axis of each grooved-pulley and a roller axis of the drive roller matched with the grooved-pulley. The chain from the drive rollers co-rotationally rotates each of the grooved-pulley, such that the rotation direction of the grooved-pulley is the same as that of the drive roller.

The chain guider also could be:

a chain guider of single wheel and reverse-rotation: m is 1, that is each group of grooved-pulleys comprises one grooved-pulley, n grooved-pulleys in n groups which are parallel to each other form the chain guider of single wheel and reverse-rotation. The several grooved-pulleys are coaxial, or some of them are coaxial, and the other grooved-pulleys have their respective grooved-pulley axis which are parallel to each other, or each grooved-pulley has their respective grooved-pulley axis and each of the grooved-pulley axis is parallel to each other, and an angle $\alpha$ is formed between the axis of each grooved-pulley and a roller axis line of the drive roller matched with the grooved-pulley. The chain from the drive rollers reverse-rotationally rotates each of the grooved-pulley, such that the rotation direction of the grooved-pulley is reverse with that of the drive roller.

The chain guider also could be:

a chain guider of double wheels and reverse-rotation: m is 2, that is each group of grooved-pulleys comprises two grooved-pulleys. Two grooved-pulleys in one group are arranged on two different pulley axes respectively and parallel to each other, and the chain guider of double wheels and reverse-rotation is formed by such n groups of grooved-pulleys. The chain from the drive rollers reverse-rotationally rotates two grooved-pulleys of each group, and the second grooved-pulleys which are rotated move a distance along the axis direction of the drive roller from the firstly grooved-pulleys which are rotated. The grooved-pulley axes of the two grooved-pulleys of the same group are parallel to each other and form an angle $\alpha$ with the axis of the drive roller. The chain from the drive rollers reverse-rotationally rotates each of the grooved-pulley in each group, such that the rotation direction of the grooved-pulley is reverse with that of the drive roller.

The corresponding grooved-pulleys in the n group, that is the first grooved-pulley which is rotated may be arranged on the same grooved-pulley axis, and each of the second grooved-pulleys which are rotated may be arranged on the same grooved-pulley axis.

The chain guider also could be:

a chain guider of triple wheels and co-rotation: m is 3, that is each group of grooved-pulleys comprises three grooved-pulleys. The two grooved-pulleys of one group which are rotated firstly and lastly are arranged on two different pulley axis respectively and parallel to each other, and another grooved-pulley is arranged on another grooved-pulley axis which forms a "品" structure with the other two grooved-pulleys over them to form the chain guider of triple wheels and co-rotation.

The lower two grooved-pulleys are parallel to each other and are not on the same plane, both of which stagger a distance along the axis of the drive roller, and an angle $\alpha$ is formed between the grooved-pulley axis of the upper grooved-pulley and the axis of the drive roller, such that the entrance of the pulley groove is aimed at the exit of the grooved-pulley that the chain firstly passing by, and the exit of the pulley groove aimed at the entrance of the grooved-pulley that the chain lastly passing by, the whole of which make the chain move the chain distance d alone the axis direction of the drive roller.

In the chain guider of triple wheels and co-rotation, the corresponding grooved-pulleys in each group areas are as follows:

the same firstly rotated grooved-pulleys are arranged on one same grooved-pulley axis, or not all of them are arranged on one same grooved-pulley axis or have their own grooved-pulley axis respectively; and/or the same lastly rotated grooved-pulleys are arranged on one same grooved-pulley axis, or not all of them are arranged on one same grooved-pulley axis, or have their own grooved-pulley axis respectively; and/or the grooved-pulley that is arranged to form the angle $\alpha$ with the axis of the drive roller, then such grooved-pulley of each group has their own grooved-pulley axis and the respective such grooved-pulley is parallel to each other.

With respect to the continuously variable transmission, wherein the speeding regulation mechanism is such a speeding regulation mechanism that makes the sum of the external diameters of the diameter-variable roller on the driving roller and the driven roller which contact with the drive chain or belt to be a constant.

The structure of the speeding regulator matched with the transmission of the conical rollers is such that the drive rollers are conical rollers. The two matched chain guider are arranged beside the driving roller and the driven roller respectively. The grooved-pulley axis of the two chain guiders are arranged on one bearing bracket respectively. The speeding regulation mechanism comprises two guide bars which are fixed on the craft; and the guide bars are parallel to the outside bars of the two conical rollers respectively. The bearing brackets may penetrate at one of the guide bars movably along the guide bar respectively; and the two of the bearing brackets are connected to be one body as a frame through one frame. A machinery which converts rotating to moving in a straight line is arranged on the frame connected to be one body. The machinery is connected with the drive mechanism and makes the two chain guiders move along the guide bars, and makes the diameters of the parts of the drive chain which contact with the two conical rollers vary correspondingly and makes the sum of the external diameters of the conical diameter-variable roller on the driving roller and the driven roller which contact with the drive chain to be a constant.

The conical rollers are drive rollers of cone shape which fix on the roller axis coaxially, and the semi-apex angle θ of the conical roller is θ<arctgμ, wherein μ is a friction index between the drive rollers and the chain or belt.

The diameter-variable structure of the diameter-variable rollers has various forms, for example, it could be various diameter-variable roller disclosed in the patent application, title of which is "a large-torque breaker-roller type constant ratio/continuously variable transmission", with the application number 200910136244.1, such as diameter-variable roller of snail type, or diameter-variable rollers of wedge type, also could be diameter-variable roller of conical-plate.

The diameter-variable rollers may be diameter-variable rollers of conical-plate, the structure of which is as follows:

Each of the conical-plate diameter-variable rollers comprises two symmetrical semi-cone plates arranged on the drive axis which is movable at the axis direction and rotatable with the drive axis respectively. Each of the semi-cone plate has a chuck body, and cones are arranged symmetrically on the facing plate surfaces of the two chuck bodies, and radial grooves spread uniformly on the cone along the bar of the frustum and at the direction of the peripheral. The diameter-variable rollers further comprise several beams, the several beams are several fan-shape sections made by a hollow cylinder with inner diameter larger than the axis diameter of the driving rollers and outer diameter equals to the minimum working diameter of the transmission, which is equally divided by a number as the number of the radial grooves and the length of the fan-shape sections is equal to the height of the hollow cylinder. The two end of each of the beams has flanges which smoothly insert into the radial grooves of the conical plate to make the inserted beams be parallel to the axis of drive rollers.

The speeding regulation mechanism used in match with the transmission of the conical-plate diameter-variable rollers may be a lever-type speeding regulation mechanism, which comprises two levers assembly. Each of the lever assembly comprises two levers parallel and coaxial with each other, and the two levers of one group are fixed through one center axis and are oscillating with the center axis as the pivot. The two ends of the central axis are inserted into two holes of the axis frame, and the two axis frames are supported and fixed on the crate. The slot holes are opened at a symmetrical length on the two ends of the lever and are hinged with one press ring respectively and the hinge axis are penetrated in the slot holes. The press rings at the two ends of the lever are sleeved at the outside of the chuck bodies of the semi-cone plates which are arranged at one side of the axis of the driving roller and of the driven roller respectively. The pushing bearings are sleeved on the drive axis between the press rings and the chuck bodies. The two levers of the other group connecting the press rings are sleeved of the axis at the outside of the semi-cone plates which are arranged at the other side of the axis of the driving roller and the driven roller, the structures of the two sides are symmetrical. The four levers of the two groups are extent a distance at the same end, and the end sockets of the extent distance connect with the drive mechanism, such that the levers of the two lever groups rotate symmetrically around the center axis.

The holes arranged on the axis frame preferably are slot holes, and a tensioner adjustment screw is screw-connected in a screw hole which set at the direction the axis frame vertical with the axes of the center axis and is supported on the center axis to adjust the tension of the chain.

The large-torque chain-guide type constant ratio/continuously variable transmission of the present invention forms biggish wrap angle through many cycles the drive chain or belt rotating between the drive roller and the chain guider, and realizes an effective friction between the chain belt and the drive roller, such that the output torque increase tens of times and the speed ratio can increase times compared with the existing continuously variable transmission, and has no specific requirement except the requirement on the tensile strength of the chain or belt, that is, has more latitude, and can choose many kinds of standard parts for the chain belt. The present invention improved the structure of the patent application "breaker roller" mentioned above, changed the structure of breaker-roller type drive roller into single drive roller matched with the structure of chain guider, such that the cubage of the improved completed machine is reduced to about a half as compared with the breaker-roller type machine, and the structure was more simple.

The transmission of the present invention, wherein the drive roller and the grooved-pulleys matched with the chain guider grooved-pulleys are not constrict synchronous. When calculating the driving wrap angle of the transmission, it only needs to calculate the wrap angle of the drive roller, which is the sum of the radian parts of the chain and the drive roller join together, without the wrap angle of the grooved-pulleys of the chain guider grooved-pulleys.

The bigger the wrap angles of the drive rollers are, the more effective of friction between the chain and the drive roller are. The wrap angle of the belt drive machinery with single drive wheel is normally about 1π and certainly less than 2π in the existing technology. Meanwhile the wrap angle is limited by the drive ratio of the driving wheel and the driven wheel. However the design of the wrap angle in present invention is without upper limit, and the wrap angle becomes bigger due to the more cycles the chain belt rotated between the drive roller and the chain guider, the bigger the wrap angle is, and the effective friction increase in geometric series accordance with the increase of the wrap angle cycles. Therefore the skidding of the chain could completely eliminate by designing the wrap angles reasonably. In fact, when the wrap angles is 10π (i.e. 5 cycles), the effective friction could be 110 times as effective friction of slack-side, and now the given output torque could satisfy a heavy load drive requirement. However, the chain roll rotating 3-4 cycles is enough for normal output torque. If using the driving roller, driven roller, chain guider and chain to consist a drive system, as long as the wrap angle is big enough, the output torque can reach the maximum limit allowed by the material. The reason using the chain guider is that when the wrap angle greater than $2\pi$, the overrides between the chains are easily to happen on the drive roller. The chain guider makes each chain cycle form sequential arrangement of almost equally distanced when the wrap angle is greater than $2\pi$ to make sure the transmission operate stably.

The drive roller in the continuously variable transmission could has a number of structures, such as the drive roller being conical roller, and the slender end of the driving conical roller being on the same side with the sick end of the driven conical roller.

The drive roller further could be a diameter-variable roller. The driving roller and the driven roller therein are diameter-variable rollers with the same or different shapes, sizes and dimensions. The diameter-variable structure of diameter-variable rollers also could be kinds of forms, such as diameter-variable roller of snail type, or diameter-variable rollers of wedge type.

The further feature of the present invention is that the friction drive system comprises driving roller, driven roller and suitable chain guider and chain, with a wrap angle not less than $2\pi$, and the driving roller and driven roller could vary their diameters synchronously, and the diameters variation of the two rollers are related and complementary. Therefore, the constant ratio/continuously variable transmission of the present invention has the following advantages:

1. The present invention realizes great wrap angle through the combination of drive rollers and chain guiders thus fundamentally eliminates the skidding phenomenon, because of which the output torque can be increased to a large extent, which increases ten times as compared with the existing continuously variable transmission conical plate, which could reach ten thousands of Nm. For the previous design of the friction drive mechanism, the problem firstly considered is the skidding. The launch of the diameter-variable rollers-chain guider mechanism makes the skidding as the last factor to be worried about. Moreover, due to the mechanism are also suitable for the driving of constant ratio, the present invention could replace the gear drive mechanism to a large extent and drive greater torque than the gear drive mechanism, especially for the heavy load the mechanism is more durable than gear drive mechanism, with lower cost of manufacture and lower maintenance requirement, and it is especially suitable for open frame and worked in vile conditions such as dust, mud or salty fog.

2. The width of belt or chain and the compression strength at the width direction are the limiting factors of the speeding ratio of the existing continuously variable transmission of conical plate. However, the present invention is not limited to this because the principle of the present invention is different, therefore the present invention can realize great speed radio which means the speed regulation range is several times greater than the former, up to 15:1.

3. The included angle between the two conical plates of the existing continuously variable transmission of conical plate is very steep, thus some sliding friction is occurred inevitably between the two conical plates when the smear of drive chain belt or the pin roll of the chain inserted in or pulled out of, affecting the drive efficiency. However the friction between chain and roller of the present invention is union rolling friction, which could realize greater drive efficiency.

4. The only function of the drive of the present invention is drive power, so there is no other requirement except the extension strength, such as triangle belt, flat belt, wire, wire rope, steel belt, chain of bicycle and industry drive chain, ordinary chain of various type and so on. Such drive standardized parts can be used and have the same effect.

5. Though there are two chain guiders added compared to the breaker-roller type, the present invention needs no synchronizer gear and the drive roller axis can arrange to be parallel to each other without space angle, which makes the structure more compact. Therefore the size of the present invention is reduced to half compared to the breaker-roller type when the output torques of them are the same.

Now two continuously variable transmissions under the present invention have been completed. The sample No. 1 has adopted single wheel and co-rotating chain guider and diameter-variable roller of conical plates with effective wrap angle $5\pi$, the greatest speed ratio 8:1, the measured output torque 120 Nm, and the drive efficiency 93%. This sample is only used for testifying the principle of this present invention. The sample No. 2 has adopted single wheel and co-rotating chain guider and diameter-variable roller of conical plates with effective wrap angle $6\pi$, the greatest speed ratio 8:2:1, the measured output torque 1500 Nm (equivalent to 3-4 times of the highest record of the existing comparable products), and the drive efficiency 93%. This sample is used for proving the present invention which can achieve large torque and the principle shows that the torque achieved by this sample is not the limit of the present invention.

DETAILED DESCRIPTION OF THE INVENTION

Figure 1:
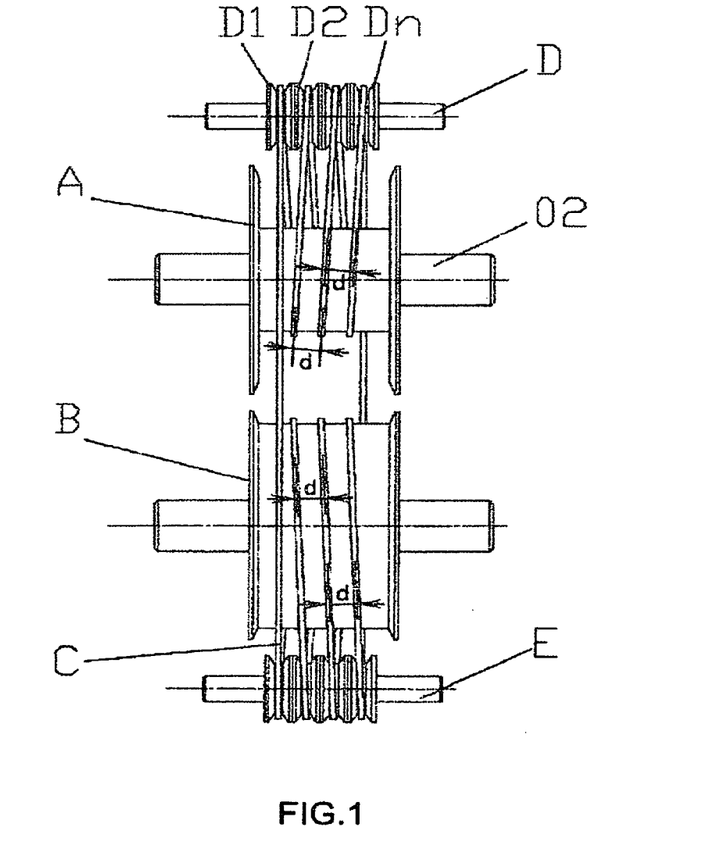
FIG. 1 is a schematic figure of the plan view structure of the general type of the large-torque chain-guide type constant ratio/continuously variable transmission of the present invention.

As shown in FIG. 1, the large-torque chain-guide type transmission of the present invention comprise driving roller A and driven roller B. The transmission could be a constant-ratio transmission, or a continuously variable transmission, depending on the drive roller. The two drive rollers of the constant-ratio transmission are drive rollers or drive wheel with fixed diameter, and the diameter of the two drive roller of the continuously variable transmission is variable. It furthermore comprises endless drive chain or belt, and is drive chain C in the present example.

Figure 2A:
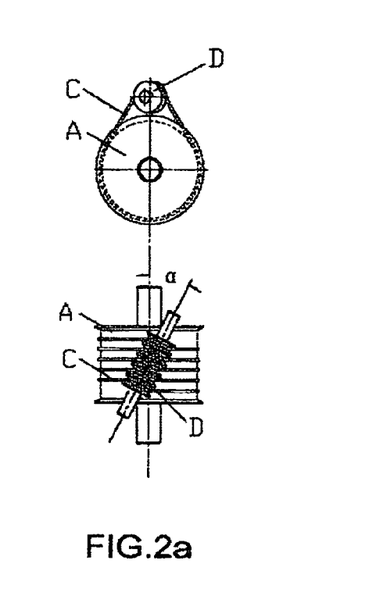
FIG. 2*a* is a schematic figure of a plan and top view structure of a combination of one drive roller and its matched single wheel and co-rotating chain guider of the transmission of the present invention.
Figure 2B:
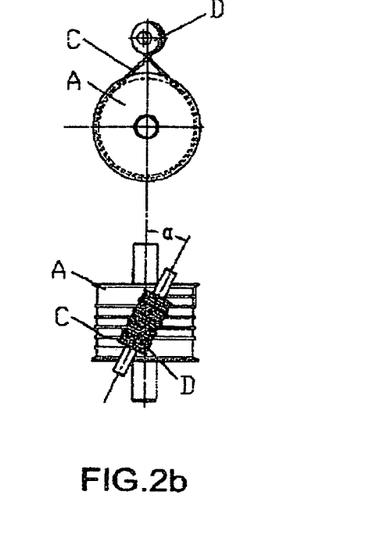
FIG. 2*b* is a schematic figure of a plan and top view structure of a combination of one drive roller and its matched single wheel and reverse-rotating chain guider of the transmission of the present invention.
Figure 2C:
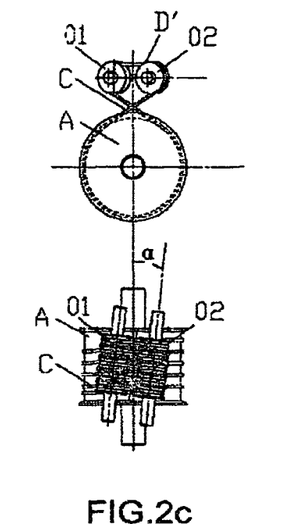
FIG. 2*c* is a schematic figure of a plan and top view structure of a combination of one drive roller and its matched double wheels and reverse-rotating chain guider of the transmission of the present invention.
Figure 2D:
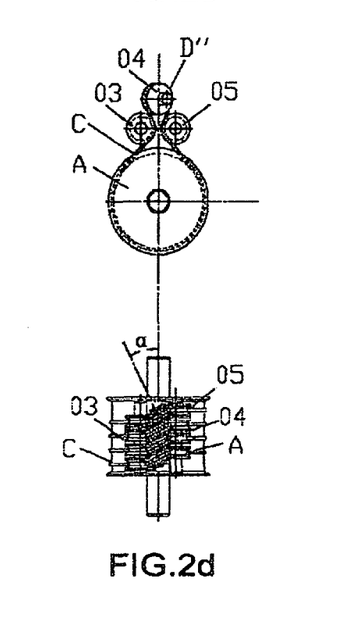
FIG. 2*d* is a schematic figure of a plan and top view structure of a combination of one drive roller and its matched triple wheels and reverse-rotating chain guider of the transmission of the present invention.

The present transmission also comprises chain guider D and chain guider E. The two chain guiders are arranged beside the driving roller A and driven roller B respectively. The chain guider D comprises n groups of grooved-pulley D1, D2 . . . Dn, wherein n is the circles the chain need to rotate over the drive roller. Each group comprises m grooved-pulleys. Each of the grooved-pulleys 01, 02, 03 in one group is arranged on their own grooved-pulley axis. Each of the grooved-pulley axis is arranged parallel to each other (as shown in FIG. 2c), or may be not all arranged parallel with each other (as shown in FIG. 2d), or only one grooved-pulley exists in one group of grooved-pulleys (as shown in FIGS. 2a and 2b). The corresponding grooved-pulleys of each group whether are arranged on one grooved-pulley axis (as shown in FIGS. 2a, 2b and 2c), or some of them are arranged on one grooved-pulley axis, or each of them is arranged on their own grooved-pulley axis (as shown in FIG. 2d). Each of the grooved-pulley can roll freely on the grooved-pulley axis, and at least one of the grooved-pulley's axis in one group makes an angle α with its suitable drive roller (as shown in FIGS. 2a, 2b, 2c and 2d). The angle α is formed between the at least one grooved-pulley axis in each group and the matched drive rollers axis (as shown in FIGS. 2a, 2b, 2c and 2d), and this angle α makes the chain entering the grooved-pulley and the chain leaving the grooved-pulley move an axial distance d on the drive roller, d is referred as chain distance. The chain distance should be greater than the width of the chain or the belt.

The endless transmission chain C in FIG. 1 is directed by the chain guider D to pass sequentially through the pulley groove of one grooved-pulley D1 to the next on D2 and then to the driving roller A, and is guided to a driven roller B after winding n cycles around both the chain guider D and the driving roller A. Thereafter, the transmission chain passes sequentially through the pulley groove of at least one grooved-pulley in one group and the driven roller B under the guidance of the chain guider E, and returns to the driven roller B to be closed after winding n cycles around both the chain guider and the driven roller.

The chain guider could have several structures as follows:

The chain guider of single wheel and co-rotating as shown in FIG. 2a, that is: chain guider D comprises n groups, each group has one grooved-pulley, n grooved-pulleys are parallel to each other and arranged on one grooved-pulley axis, which means several grooved-pulleys are coaxial, each grooved-pulley rotate freely on axis, an angle α is formed between the at least one grooved-pulley's axis and its matched drive roller, the chain or belt from the drive roller rotate the grooved-pulley consequently, making the turn direction of the grooved-pulley being the same with that of the drive roller, the angle α between the grooved-pulley and the drive roller axis enables the chain entering the chain guider and the chain leaving the chain guider to move a certain axial distance, i.e. a chain distance d, on the drive rollers, wherein the chain distance d is larger than the width of the drive chain (the chain distance hereinafter is the same and will not be described). The chain C from the drive rollers co-rotationally rotates each of the grooved-pulley, making the rotation direction of the grooved-pulley same with that of the drive roller.

The chain guider of single wheel and reverse-rotating as shown in FIG. 2b, that is: chain guider D comprises n groups, each group has one grooved-pulley, n grooved-pulleys are arranged on one grooved-pulley axis, that is several of the grooved-pulleys are coaxial, each grooved-pulley rotates freely on axis, and an angle α is formed between the axis of grooved-pulley and a roller axis of the drive roller A matched with the same grooved-pulley, the angle α enables the chain entering the chain guider and the chain leaving the chain guider to move a chain distance d on the drive rollers, the chain C from the drive rollers reverse-rotationally rotates each of the grooved-pulley, making the rotation direction of the grooved-pulley reverse with that of the drive roller.

The chain guider of double wheels and reverse-rotation as shown in FIG. 2c, that is: chain guider D' comprises n groups, each group of grooved-pulley comprises two grooved-pulleys 01 and 02, two grooved-pulleys 01 and 02 of one group in parallel are arranged on two different grooved-pulley axis respectively, each grooved-pulley rotates freely on axis, the chain from the drive rollers reverse-rotationally rotates two grooved-pulleys of each group, the latter rotated grooved-pulley 02 than the firstly rotated grooved-pulley 01 moves a distance along the axis direction, the two grooved-pulley axis are parallel to each other and an angle α is formed between the axis of grooved-pulley and a roller axis of the drive roller, such that the angle α enables the chain entering the chain guider and the chain leaving the chain guider to move a chain distance d along the axis direction of the drive rollers, the chain C from the drive rollers reverse-rotationally rotates each of the grooved-pulley, making the rotation direction of the grooved-pulley reverse with the drive roller.

The chain guider of triple wheels and co-rotation as shown in FIG. 2d, that is: chain guider D" comprises n groups, each group of grooved-pulley comprises three grooved-pulleys 03, 04 and 05 arranged on three different pulleys axis respectively, the two grooved-pulleys 03 and 05 of one group which are rotated firstly and lastly are arranged on two different grooved-pulley axis respectively and are parallel to each other, another grooved-pulley are arranged on another grooved-pulley axis forming "冊" structure with the other two grooved-pulleys to form the chain guider of triple wheels and co-rotation, the lower two grooved-pulleys 03 and 05 are parallel to each other but are not in the same plane, which stagger a distance along the axis of the drive roller. As the example shown in FIG. 2d, the axis of grooved-pulleys 03 and 05 is parallel to the axis of the drive roller. An angle α is formed between the axis of the upper grooved-pulley and the axis of the drive roller. The axis direction is: the entrance of the groove-pulley 04 aimed into the exit of the grooved-pulley 03 the chain firstly passed, and the exit of the grooved-pulley 02 aimed into the entrance of the grooved-pulley 05 the chain lastly passed, the whole of which makes the chain move the chain distance d alone the axis direction of the drive roller, each grooved-pulley may rotate freely on axis, the upper grooved-pulley 04 in each group is arranged on one grooved-pulley axis respectively, and respective grooved-pulley axis is parallel to each other, and the n grooved-pulleys 04 may also be arranged on one grooved-pulley axis.

The drive rollers forming the present transmission may be drive roller or drive wheel with fixed diameter, which form constant-ratio transmission. The drive rollers may also be a diameter-variable structure, which form continuously variable transmission.

The literature titled "a large-torque breaker-roller type constant ratio/continuously variable transmission", with application number 200910136244.1 publicized kinds of diameter-variable rollers, all of which could be used in the continuously variable transmission of the present invention. The different is that in the present transmission the driving wheel and the driven wheel comprise one diameter-variable roller respectively and are matched with one of the chain guiders.

Figure 3:
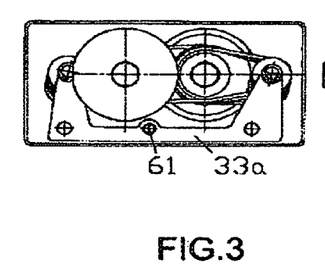
FIG. 3 is a structure schematic figure of plan view of the large-torque chain-guide type continuously variable transmission of the present invention, wherein the drive roller is the conical roller.
Figure 4:
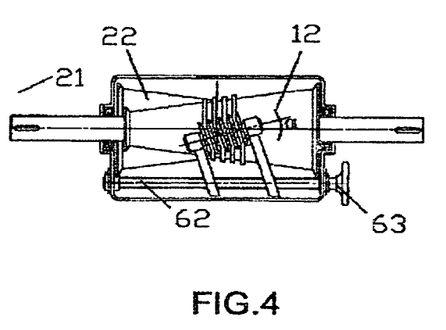
FIG. 4 is a structure schematic figure of left view of FIG. 3.
Figure 5:
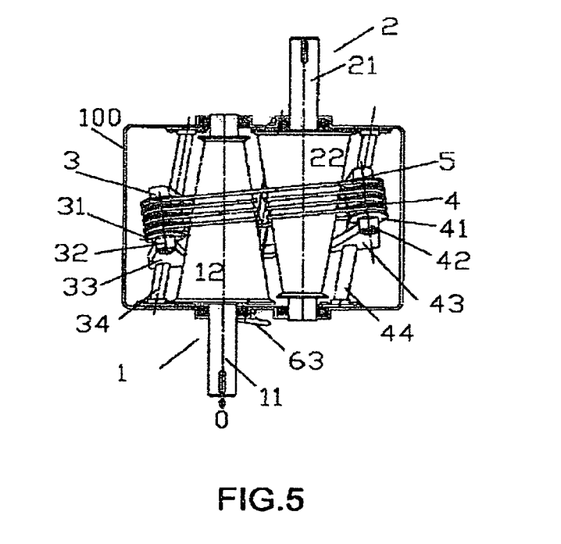
FIG. 5 is a structure schematic figure of top view of FIG. 3.
Figures 6, 7:
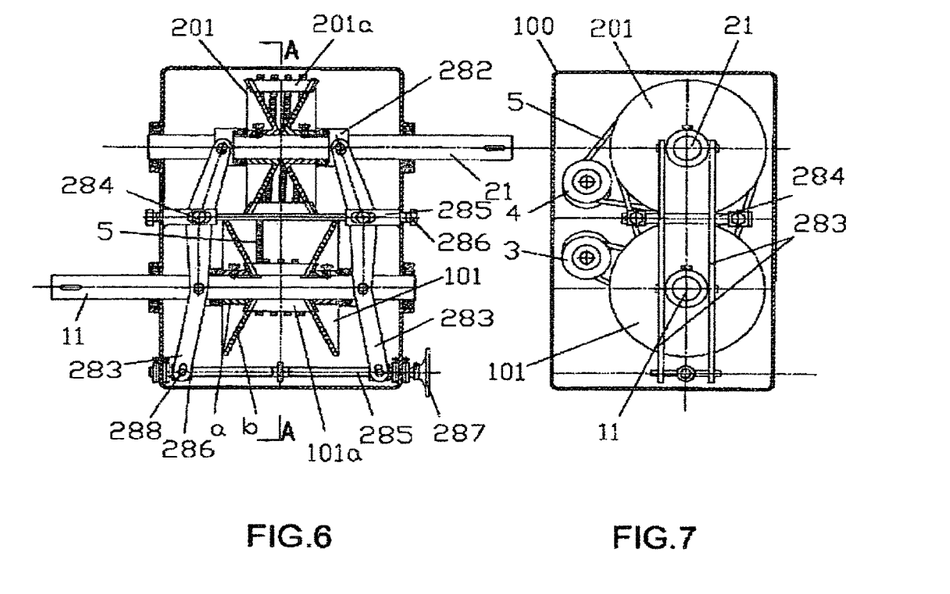
FIG. 6 is a structure schematic figure of plan view of the large-torque chain-guide type continuously variable transmission of the present invention, wherein the drive roller is the diameter-variable roller of conical plates.
FIG. 7 is a structure schematic figure of left view of FIG. 6.
Figure 8:
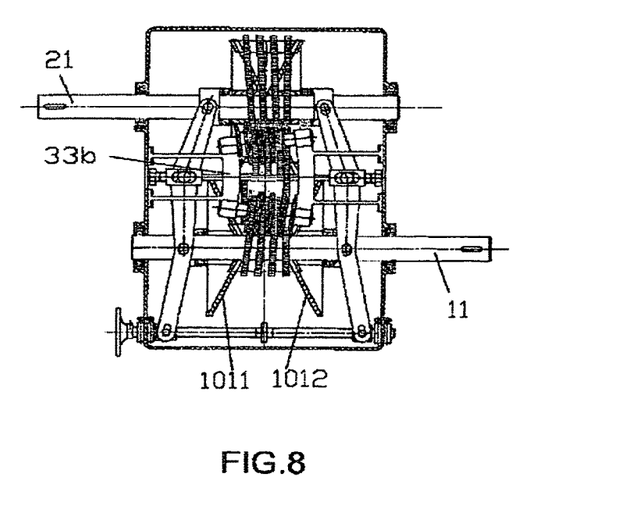
FIG. 8 is a structure schematic figure of back view of FIG. 6.
Figure 9:
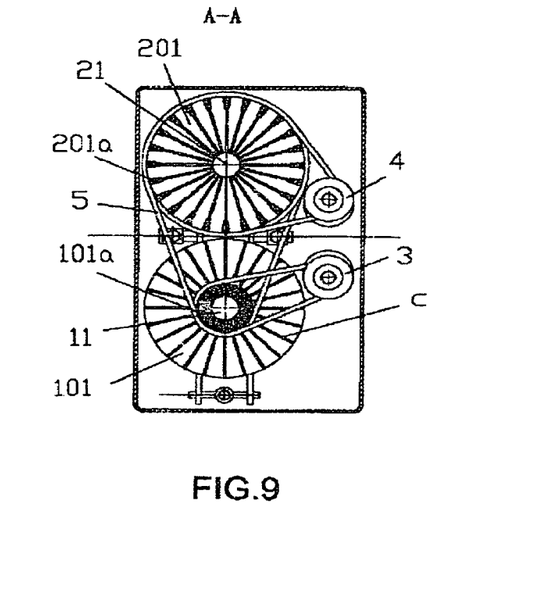
FIG. 9 is a structure schematic figure of A-A section view of FIG. 6.

The specific example could be:

The present large-torque chain-guide type transmission comprises drive roller and endless drive chain as shown in FIGS. 3, 4 and 5, the drive roller comprises driving roller 1 and driven roller 2, which are arranged on crate 100 by bearing, each of the drive roller comprises one roller axis 11, 21, and drive rollers 12 and 22 are fixed and arranged on each of the roller axis; the drive roller is conical roller, the conical roller is a conical roller with diameter gradually greater or gradually smaller at axis direction 0, the big end of the driving roller 1 and the small end of the driven roller are arranged correspondingly; the external diameter of the diameter-variable rollers which contact with the drive chain or belt is structure of variable in size;

In the continuously variable transmission as shown in FIGS. 3, 4 and 5, the two matched chain guiders 3 and 4 are arranged beside the driving roller 1 and the driven roller 2 respectively, and they is single wheel and co-rotating chain guider.

m is 1, that is, each group of grooved-pulley comprises a grooved-pulleys 31 and 41, n is 4, that is, each chain guider is comprised of groups of grooved-pulleys which are parallel to each other, and each of the grooved-pulley 31 and 41 rotates freely on the grooved-pulley axis 32 and 42, the 4 grooved-pulleys are coaxial, each of the grooved-pulley axis 32 and 42 form an angle α with the roller axis 11 and 21 of its matched drive roller 1 and 2, the chain 5 from the drive roller co-rotationally rotate sequentially over each of the grooved-pulley, making the grooved-pulley rotating direction same with that of the drive roller, the angle α between the axis of the grooved-pulley and the axis of drive roller enable the chain entering the grooved-pulley and leaving the grooved-pulley move a axial distance d on the drive roller, that is the chain distance.

The endless drive chain 5 passes sequentially through the pulley groove of one grooved-pulley in one group to the driving roller, then to the pulley groove of one grooved-pulley in next group and then to the driving roller under the guidance of the chain guider, and is guided to a driven roller after rotating n cycles between the driving roller and its matched chain guider, the drive chain passes sequentially through the pulley groove of one grooved-pulley in one group to the driven roller, then to the pulley groove of one grooved-pulley in next group and then to the driven roller under the guidance of the chain guider, and returns to the driving roller to be closed after rotating n cycles between the driven roller and its matched chain guider; the axial 32 and 42 of the two chain guiders are arranged on the bearing bracket 33 and 43 respectively.

The present large-torque chain-guide type continuously variable transmission further comprises speeding regulation mechanism, which is connected with the diameter-variable rollers or the chain belt, such that the external diameters of the diameter-variable rollers which contacts with the drive chain or belt is variable.

As shown in FIGS. 3, 4 and 5, the speeding regulation mechanism may:

two guide bars 34 and 44 which are fixed on the crate 100; the guide bars 34 and 44 are parallel to the outside of bus bar of the conical rollers; the bearing brackets 33 and 43 penetrate on the guide bars 34 and 44 and are movable along the guide bars; the two bearing brackets 33 and 43 form as one body through one frame 33a, a screw hole 61 is arranged on the frame 33a, and a speeding regulation leading screw 62 is penetrated in the screw hole 61, the speeding regulation leading screw 62 are supported and fixed on the crate 100 rotatably, and one end of the speeding regulation leading screw 62 is equipped with a rotating grip 63 or connected with a speeding regulation electrical motor (not shown in figures). By rotating the rotating grip 63 or starting the speeding regulation electrical motor, the two chain guiders will move along the guide bars, such that the diameters of the parts of the drive chain which contact with the two conical rollers vary correspondingly and that the sum of the external diameters of the conical roller of the driving roller 1 and the driven roller 2 which contact with the drive chain is a constant.

The diameter-variable rollers could be diameter-variable roller of snail type described above, diameter-variable rollers of wedge type, and the diameter-variable rollers of umbrella jackstay type, and the speeding regulation mechanism thereof also could be the corresponding speeding regulation structure which matched with the corresponding diameter-variable rollers disclosed in the above literature. The roller connecting with the driving force in the driving breaker-roller in the transmission of the above literature is equivalent to the driving roller in the transmission of the present invention, and the other roller in the breaker-roller evolves into the chain guider of the present invention. There is no synchronization mechanism between the chain guider and the driving roller. Also, the roller connecting with the load in the driven breaker-roller in the transmission of the above literature is equivalent to the driven roller in the transmission of the present invention, and the other roller in the breaker-roller evolves into the other chain guider of the present invention. There is no synchronization mechanism between the chain guider and the driven roller either. The speeding regulation mechanism is arranged between the driving roller and the driven roller, which is essentially the same as the speeding regulator of the above literature in structure. The only distinction is that there is no speeding regulation mechanism between the two chain guiders. Therefore, the speeding regulator of the present invention is just a speeding regulation mechanism which performs speeding regulation to the two drive rollers.

Furthermore, the present invention also provides the following diameter-variable rollers and matched speeding regulation mechanism.

As shown in FIGS. 6-9, wherein the drive roller is diameter-variable roller of conical plates, each set of the two diameter-variable roller of conical plates comprise a pair of conical plates 101 and 201 fixed on the drive axis 11 and 12 which is movable at the direction of axis and two beams 101a and 201a corresponding with the conical plates. A bearing is used to support and fix between the drive axis and the crate 100.

Taking driving diameter-variable rollers as an example, a conical plate 101 comprises two symmetrical semi-cone plates 1011 and 1012, each of which has chuck body a, and cones b are arranged symmetrically on the facing surfaces of the two chuck bodies a, and radial grooves c spread uniformly on the cone b along the bus of the frustum and at the direction of the peripheral.

An angle α is formed between the bus bar of the conical plates and the surface of the conical plates, wherein α>arctg μ, μ is the friction index between the beams and the conical plates.

Beams 101a and 201a are fan-shape sections bar made by a hollow cylinder with inner diameter larger than the axis diameter of the rollers axis 11 and 21 and outer diameter equals to the minimum working diameter of the transmission, which is equally divided with a number as the number of the radial grooves and the length of the fan-shape sections is equal to the height of the hollow cylinder, the two ends of each of the beams 101a and 201a have flanges which are smoothly inserted into the radial grooves of the conical plate to make the inserted beams parallel to the axis of drive rollers.

The endless drive chain 5 passes sequentially through a pulley groove in one group of grooved-pulleys to the driving roller 101, then to the pulley groove in next group of grooved-pulleys and then to the driving roller 101 under the guidance of the chain guider 3, and is guided to a driven roller 201 after rotating 4 cycles around both the chain guider 3 and the driving roller 101, thereafter, passes sequentially through the pulley groove in one group of grooved-pulleys to the driven roller 201, then to the pulley groove in next group of grooved-pulleys and then to the driven roller 201 under the guidance of the chain guider 4, and returns to the driving roller 101 to be closed after rotating 4 cycles around the driven roller 201.

The structure between the chuck body a of the semi-cone plate and the drive axis 11 is that there is a corresponding key slot arranged in the axle hole of the chuck body a and the drive axis 11, in which the bond connecting the two, so that the semi-cone plate can move axially on drive axis 11 and rotate in the circumferential direction with drive axis. There is also a connection structure shown in FIG. 6. The screw hole is open on the sidewall of the axis section of the axle hole section of the chuck body a, and the screw is screwed in the screw hole, and the screw socket is inserted in the long groove of the drive axis 11 and can freely slide in the long groove so that the semi-cone plate can rotate with the drive axis and can move axially on the drive axis.

Corresponding the diameter-variable roller of conical plates, the speeding regulation mechanism is a speeding regulation mechanism of lever type as the same as that publicized in the abovementioned literature, which comprises two lever assemblies, each of which comprises two levers 283 parallel and coaxial to each other, wherein the two levers of one group levers are fixed through one center axis 284 and are oscillating with the center axis as the pivot, two ends of the central axis 284 are inserted into two long holes of the axis frame 285, and the two axis frames are supported and fixed on the crate 100; a holes arranged on the axis frame 285 are slot holes, and a tension adjustment screw 286 is screw-connected in a screw hole which set at the direction the axis frame 285 vertical to the axes of the center axis and is supported on the center axis 284 to adjust the tension of the chain. The slot holes are formed at a symmetrical length on the two ends of the lever and are hinged with one press ring 282 respectively and the hinge axis penetrates in the slot holes. The press rings 282 in the two ends of the lever are sleeved at the outside of the chuck bodies a of the semi-cone plates which are arranged at one side of the axis of the drive axis 11 and of the drive axis 21 respectively and the pushing bearings are sleeved on the drive axis between the press rings and the chuck bodies a, avoiding the slide friction between the press rings and the chuck bodies. Two levers of the other group connecting the press rings are sleeved of the axis at the outside of the semi-cone plates which are arranged at the other side of the drive axis 21 and the drive axis 11, the structures of the two sides are symmetrical; the four levers of the two groups are extent a distance at the same end, and the end sockets of the extent distance connect with the drive mechanism, such that the levers of the two lever groups rotate symmetrically around the center axis 284. Specifically, the end sockets of the respective extent distance of the lever of the two groups of the levers 283 hinges one end of the axis 288. The middle of the axis is a reciprocating screw 286, and a screw 285 through the bearing fix on crate 100 with parallel to the drive axis 11 and 21, the thread directions of two ends of the screw rod is opposite, one is right-hand, the other is left-hand. There is a thread set at the two ends of the screw 285 respectively, and the rotating direction of the two threads is reverse which rotate into the screw symmetrically. On the two groups of levers, two reciprocating lever nut 286 thread opposite, symmetrically screwed into the screw. The drive mechanism is connected on the screw, and the drive mechanism is connected with a speeding regulation electrical machinery which could rotate in co-direction or reverse direction or a handle 287.

Speeding regulation electrical machinery or handing crack 287 could drive screw 285 to rotate in co-direction or reverse direction, so as to push one end of the two group levers 283 to separate or combine symmetrically and the other end of the levels do the reverse action to drive the pressing rings to change the spacing between the two semi-cone plates so as to change the radical position of the beams on the conical plates, that is to change the working semi diameter of the diameter-variable rollers. The levers is rigidity configuration, which guarantees the consistency of the action to the rollers. However axial symmetry between the two hinged ends of the levers and the central axis guarantees the change of the working semi diameter of the two drive rollers to vary are of equal in sizes and reverse in direction, that is the complementary of actions. The speeding regulation could be handle or using servomotor or direct-current dynamo. The chain guiders 3 and 4 are fixed on the crate 100 by the shelving 33b.

The chain guiders in the above embodiments also could be the abovementioned other type of chain guiders.

What is claimed is:

1. A chain-guide transmission comprising drive rollers and an endless drive chain or belt (C),
   the drive rollers comprise a driving roller (A) and a driven roller (B),
   further comprises a first chain guider (D) and a second chain guider (E), the first chain guider (D) and the second chain guider (E) are arranged beside the driving roller (A) and the driven roller (B) respectively,
   each of the first chain guider (D) and the second chain guider (E) comprises grooved-pulleys (D1, D2 . . . Dn) in a quantity of n+1, wherein n is a number of times the drive chain winds around each of the drive rollers; for each of the first chain guider (D) and the second chain guider (E), the n+1 grooved-pulleys are parallel to one another and arranged on a grooved-pulley axis, which means the n+1 grooved-pulleys are coaxial, each grooved-pulley rotates freely on the grooved-pulley axis, an angle ($\alpha$) greater than 0 degree and less than 180 degrees is formed between the grooved-pulley axis and an axis of a respective drive roller that corresponds to the grooved-pulley axis, the drive chain or belt winding around the respective drive roller rotates the n+1 grooved-pulleys consequently, making the grooved-pulleys rotate in the same direction with that of the respective drive roller, the angle ($\alpha$) between the grooved-pulley axis and the axis of the respective drive roller enables the drive chain to displace axially along the respective drive roller by a chain distance (d) in every next winding around the respective drive roller, wherein the chain distance (d) is larger than a width of the chain;

the endless drive chain or belt (C) is directed by the first chain guider (D) to pass sequentially through a pulley groove of a first grooved-pulley (D1) on the first chain guider (D) to the driving roller (A), then to a next grooved-pulley (D2) on the first chain guider (D) and then back to the driving roller (A) again, and is guided to the driven roller (B) after winding n times around the driving roller (A), thereafter, the drive chain passes sequentially through a pulley groove of a first grooved-pulley on the second chain guider (E) to the driven roller (B), then to a next grooved-pulley on the second chain guider (E) and then back to the driven roller (B) again, after winding n times around the driven roller (B), the drive chain is joined with a tail part thereof to form a close loop.

2. The chain-guide transmission according to claim 1, wherein the chain-guide transmission is a constant-ratio transmission, each of the drive rollers of the constant-ratio transmission has a fixed diameter.

* * * * *